(12) United States Patent
Takeda et al.

(10) Patent No.: US 11,218,998 B2
(45) Date of Patent: Jan. 4, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 149 days.

(21) Appl. No.: 16/634,278

(22) PCT Filed: Jul. 28, 2017

(86) PCT No.: PCT/JP2017/027571
§ 371 (c)(1),
(2) Date: Jan. 27, 2020

(87) PCT Pub. No.: WO2019/021487
PCT Pub. Date: Jan. 31, 2019

(65) Prior Publication Data
US 2020/0163080 A1 May 21, 2020

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0082* (2013.01); *H04W 72/0446* (2013.01); *H04W 80/08* (2013.01); *H04W 72/1289* (2013.01)

(58) Field of Classification Search
CPC ......... H04W 72/0413; H04W 72/0446; H04W 80/08; H04W 72/1289; H04L 5/0082; H04L 5/0037; H04L 1/1861; H04L 1/0031
See application file for complete search history.

(56) References Cited

U.S. PATENT DOCUMENTS

| 2015/0085787 | A1* | 3/2015 | Ouchi | H04L 5/0037 |
| | | | | 370/329 |
| 2019/0037586 | A1* | 1/2019 | Park | H04L 1/0031 |
| 2020/0127772 | A1* | 4/2020 | Papasakellariou | H04L 1/1861 |

OTHER PUBLICATIONS

Written Opinion for corresponding International Application No. PCT/JP2017/027571, dated Sep. 5, 2017 (3 pages).

(Continued)

*Primary Examiner* — Vinncelas Louis
(74) *Attorney, Agent, or Firm* — Osha Bergman Watanabe & Burton LLP

(57) ABSTRACT

To appropriately perform communication even when transmission timings and/or transmission durations of a data channel and/or uplink control information are flexibly (variably) controlled, one aspect of a user terminal according to the present invention includes: a transmission section that transmits uplink control information; and a control section that controls the transmission of the uplink control information that uses an uplink shared channel, and at least one of a transmission timing and/or a transmission duration of the uplink shared channel, and a transmission timing and/or a transmission duration of the uplink control information are able to be configured differently per transmission, and, when the transmission duration of the uplink shared channel and at least part of the transmission duration of the uplink control information overlap, the control section transmits the uplink control information by using the uplink shared channel.

5 Claims, 12 Drawing Sheets

(51) Int. Cl.
*H04W 80/08* (2009.01)
*H04W 72/12* (2009.01)

(56) References Cited

OTHER PUBLICATIONS

International Search Report for corresponding International Application No. PCT/JP2017/027571, dated Sep. 5, 2017 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Nokia et al.; "Simultaneous Transmissions of UL Signals for Shortened TTI Operation"; 3GPP TSG-RAN WG1 Meeting #86, R1-167019; Gothenburg, Sweden; Aug. 22-26, 2016 (5 pages).
Nokia et al.; "On processing time reduction between PDSCH transmission and DL HARQ feedback"; 3GPP TSG-RAN WG1 Meeting #86bis, R1-1609320; Lisbon, Portugal; Oct. 10-14, 2016 (8 pages).
Ericsson; "UCI on sPUSCH with short TTI"; 3GPP TSG-RAN WG1 #86 bis, R1-1610473; Lisbon, Portugal; Oct. 10-14, 2016 (4 pages).
Extended European Search Report issued in counterpart European Patent Application No. 17918883.4, dated Dec. 14, 2020 (9 pages).
NTT DOCOMO, Inc.; "UCI on PUSCH"; 3GPP TSG RAN WG1 NR Ad-Hoc#2, R1-1711104; Qingdao, P.R. China Jun. 27-30, 2017 (5 pages).
Sharp; "UCI reporting On PUCCH and PUSCH"; 3GPP TSG RAN WG1 Meeting #89, R1-1708374; Hangzhou, P.R. China; May 15-19, 2017 (3 pages).
NTT DOCOMO, Inc.; "Views on UCI on sPUSCH"; 3GPP TSG RAN WG1 Meeting #89, R1-1708420; Hangzhou, P.R. China; May 15-19, 2017 (4 pages).
NTT DOCOMO, Inc.; "UCI on PUSCH"; 3GPP TSG RAN WG1 Meeting #90, R1-1713945; Prague, Czechia; Aug. 21-25, 2017 (7 pages).

* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G, 5G, 5G+(plus), New-RAT (NR), and LTE Rel. 14 and 15~) have been also studied.

Uplink (UL) of legacy LTE systems (e.g., LTE Rel. 8 to 13) supports DFT-spread-OFDM (DFT-s-OFDM: Discrete Fourier Transform-Spread-Orthogonal Frequency Division Multiplexing) waveform. The DFT-spread-OFDM waveform is a single carrier waveform, and consequently can prevent an increase in a Peak to Average Power Ratio (PAPR).

Furthermore, in the legacy LTE systems (e.g., LTE Rel. 8 to 13), the user terminal transmits Uplink Control Information (UCI) by using a UL data channel (e.g., PUSCH: Physical Uplink Shared Channel) and/or a UL control channel (e.g., PUCCH: Physical Uplink Control Channel).

Transmission of the UCI is controlled based on whether or not simultaneous PUSCH and PUCCH transmission is configured and whether or not the PUSCH is scheduled in a TTI for transmitting the UCI. Transmitting UCI by using a PUSCH will be also referred to as UCI on PUSCH.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., LTE Rel. 14 or subsequent releases, 5G or NR) to flexibly control scheduling of a data channel (also referred to simply as data including a DL data channel and/or a UL data channel). For example, it has been studied to make a transmission timing and/or a transmission duration (also referred to as a "transmission timing/transmission duration" below) of data changeable (variable length) per scheduling. Furthermore, it has been studied to make a transmission acknowledgement signal (also referred to as HARQ-ACK, ACK/NACK and A/N) for data transmission changeable per transmission, too.

There is a risk that, when a transmission rule (e.g., UCI on PUSCH) that fixedly configures transmission timings and/or transmission durations of data and uplink control information (e.g., A/N) and is the same as those of the legacy LTE systems is applied to this future radio communication system, it is not possible to appropriately transmit and receive a data channel and uplink control information that can be transmitted in a transmission duration of a variable length.

The present invention has been made in light of this point, and one of objects of the present invention is to provide a user terminal and a radio communication method that can appropriately perform communication even when transmission timings/transmission durations of a data channel and/or uplink control information are flexibly (variably) controlled.

Solution to Problem

One aspect of a user terminal according to the present invention includes: a transmission section that transmits uplink control information; and a control section that controls the transmission of the uplink control information that uses an uplink shared channel, and at least one of a transmission timing and/or a transmission duration of the uplink shared channel, and a transmission timing and/or a transmission duration of the uplink control information are able to be configured differently per transmission, and, when the transmission duration of the uplink shared channel and at least part of the transmission duration of the uplink control information overlap, the control section transmits the uplink control information by using the uplink shared channel.

Advantageous Effects of Invention

According to the present invention, it is possible to appropriately perform communication even when transmission timings/transmission durations of a data channel and/or uplink control information are flexibly (variably) controlled.

DESCRIPTION OF EMBODIMENTS

Figure 1A:
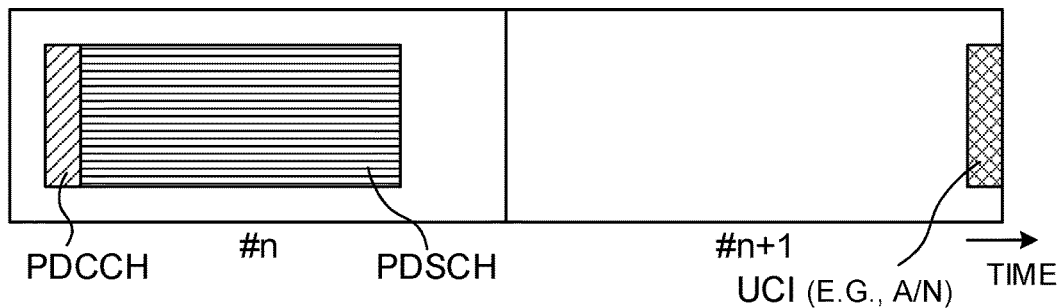
FIGS. 1A to 1E are diagrams illustrating one example of DL data (PDSCH) in a case where non-slot-based scheduling is applied, and a transmission timing/transmission duration of UCI (e.g., A/N) matching the DL data.

It has been studied for a future radio communication system (e.g., LTE Rel. 14 or subsequent releases, 5G or NR) to use a time unit (e.g., at least one of a slot, a mini slot or a given number of symbols) whose time duration is changeable as a scheduling unit of a data channel (also referred to simply as data including a DL data channel and/or a UL data channel).

In this regard, the slot is a time unit based on numerologies (e.g., a subcarrier-spacing and/or a symbol length) applied by a user terminal. The number of symbols per slot may be defined according to the subcarrier-spacing. When, for example, the subcarrier-spacing is 15 kHz or 30 kHz, the number of symbols per slot may be 7 or 14 symbols. On the other hand, when the subcarrier-spacing is 60 kHz or more, the number of symbols per slot may be 14 symbols.

The subcarrier-spacing and a symbol length have a relationship of a reciprocal. Hence, when the number of symbols per slot is identical, as the subcarrier-spacing is higher (wider), the slot length is shorter, and, as the subcarrier-spacing is lower (narrower), the slot length is longer.

Furthermore, the mini slot is a time unit shorter than the slot. The mini slot may include a smaller number of symbols (e.g., 1 to (slot length−1) symbols such as 2 or 3 symbols) smaller than that of the slot, numerologies (e.g., a subcarrier-spacing and/or a symbol length) identical to those of the slot may be applied to the mini slot in the slot, or numerologies (e.g., a subcarrier-spacing higher than the slot and/or a symbol length shorter than the slot) different from those of the slot may be applied.

The future radio communication system is assumed to control transmission and reception (or, for example, allocation) of a signal and/or a channel by applying a plurality of time units to scheduling of, for example, data as different time units from those of the legacy LTE systems are introduced. It is considered that, when scheduling of, for example, data is performed by using the different time units, there are, for example, pluralities of data transmission durations and/or transmission timings. For example, the user terminal that supports a plurality of time units transmits and receives data to be scheduled in the different time units.

In one example, it is considered to apply scheduling (slot-based scheduling) in a first time unit (e.g., a slot unit), and scheduling (non-slot-based scheduling) in a second time unit (e.g., a non-slot unit) shorter than the first time unit. The non-slot unit may be a mini slot unit or a symbol unit. In addition, the slot can include, for example, 7 symbols or 14 symbols, and the mini slot can include 1 to (slot length−1) symbols.

In this case, a data transmission timing/transmission duration in a time direction differ according to a data scheduling unit. When, for example, slot-based scheduling is performed, one data is allocated to 1 slot. On the other hand, when non-slot-based (mini slot-based or symbol-based) scheduling is performed, data is selectively allocated to part of a domain of 1 slot. Hence, when non-slot-based scheduling is performed, a plurality of items of data can be allocated to 1 slot.

Furthermore, the future radio communication system is assumed to make a transmission timing/transmission duration of, for example, data, changeable per scheduling (transmission) to flexibly control scheduling of, for example, the data. For example, according to non-slot-based scheduling, an allocation position starts from one of symbols per scheduling, and data (e.g., a PDSCH and/or a PUSCH) is arranged over a given number of symbols.

Similar to data (e.g., PDSCH) whose transmission timing/transmission duration are variably changed, UCI (e.g., A/N) for the data is assumed to be configured to make a transmission timing/transmission duration changeable per transmission. For example, a base station indicates the transmission timing/transmission duration of the UCI to a UE by using downlink control information and/or a higher layer signaling. In this case, an A/N feedback timing is flexibly configured in a duration subsequent to downlink control information and/or a corresponding PDSCH for notifying at a transmission timing/transmission duration of this A/N.

FIG. 1 illustrates one example of a case where non-slot-based scheduling is applied to change and control transmission timings/transmission durations of data (PDSCH) and A/N for the data per transmission. Information related to allocation of the PDSCH (e.g., transmission timing/transmission duration) may be included in a PDCCH and/or a higher layer signaling and notified to the UE. Furthermore, information related to an allocation domain (transmission timing/transmission duration) of A/N for the PDSCH may be included in the downlink control information (PDCCH) for scheduling the PDSCH, and notified to the UE. In addition, resource information used for A/N transmission may be notified to the UE by the downlink control information.

FIG. 1 illustrates a case where one or both of two time units (slots # n and # n+1 in this case) are used to transmit a downlink control channel (PDCCH), a downlink shared channel (PDSCH) and UCI (e.g., A/N). However, the number of slots to which a signal and/or a channel are allocated is not limited to this.

Figure 1B:
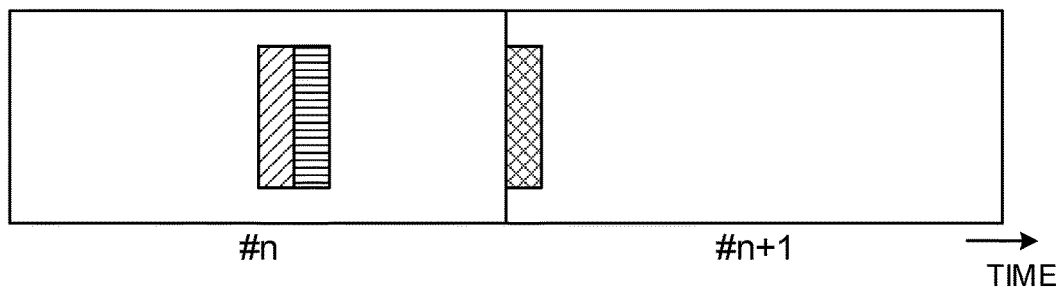

FIGS. 1A and 1B illustrate cases where the base station transmits the PDCCH and the PDSCH in the slot # n, and the UE transmits A/N for the PDSCH in the next slot # n+1. In FIG. 1A, a transmission duration (e.g., mini slot size) of the PDSCH is configured wide, and A/N is allocated to an end domain of a next slot (a domain including at least a last symbol). In FIG. 1B, a transmission duration of the PDSCH is configured short, and A/N is allocated to a head domain (a domain including at least a head symbol) of the next slot.

Figure 1C:
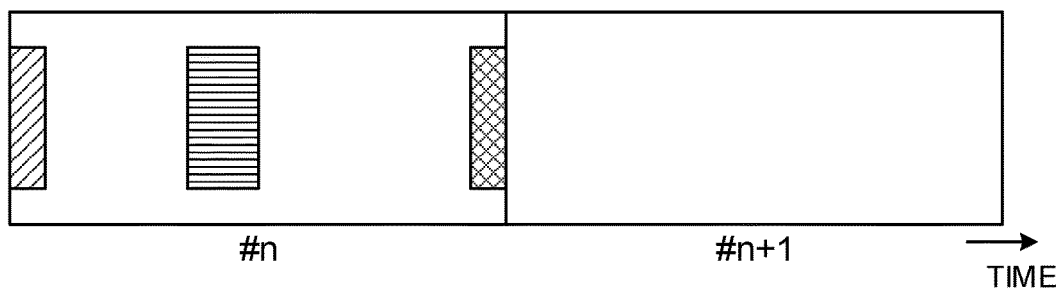
Figure 1D:
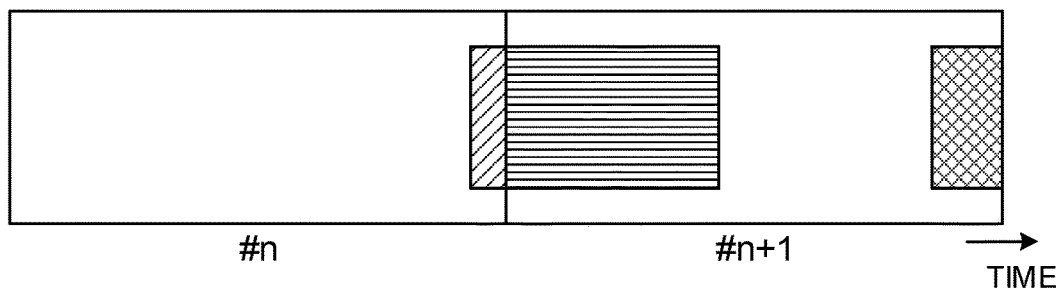
Figure 1E:
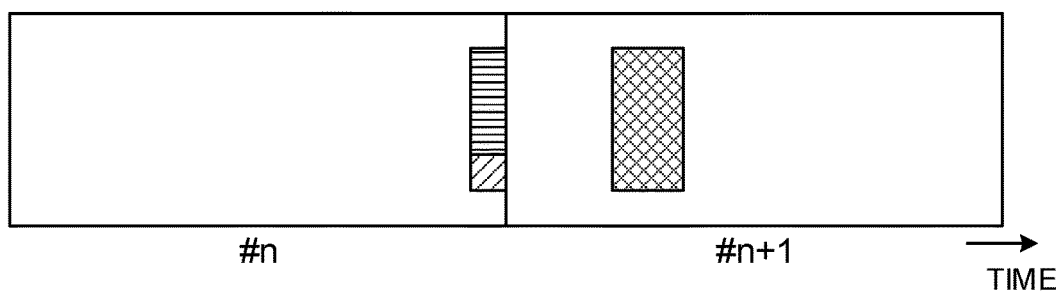

FIG. 1C illustrates a case where a PDCCH, a PDSCH and A/N are transmitted and received in 1 slot (the slot # n in this case). In FIG. 1D, the PDCCH is transmitted and received in the slot # n, and the PDSCH and/or the A/N are transmitted and received in the slot # n+1. In this case, the base station allocates the PDCCH to the end domain of the slot # n, and allocates the PDSCH to a given range from a head of the slot # n+1. The UE transmits the A/N for the PDSCH by using the given symbol to the end domain of the slot # n+1. In FIG. 1E, the base station performs frequency multiplexing on and transmits the PDCCH and the PDSCH in the slot # n, and the UE transmits the A/N for the PDSCH in the slot # n+1.

Thus, when DL data is scheduled in the non-slot unit, it is possible to flexibly configure transmission timings/transmission durations of the downlink control channel, the downlink data channel and A/N. It is also considered to flexibly configure a transmission timing/transmission duration of UL data similar to the DL data.

FIG. 2 illustrates one example of a case where non-slot-based scheduling is applied to change and control data (PUSCH) and transmission timings/transmission durations of the data per transmission. Information related to allocation of the PUSCH (e.g., transmission timing/transmission duration) may be included in a PDCCH (e.g., UL grant) and/or a higher layer signaling for instructing transmission of the PUSCH, and notified to the UE.

FIG. 2 illustrates a case where one or both of two time units (the slots # n and # n+1 in this case) are used to transmit a downlink control channel (PDCCH) and a downlink shared channel (PUSCH). However, the number of slots to which a signal and/or a channel are allocated is not limited to this.

Figure 2A:
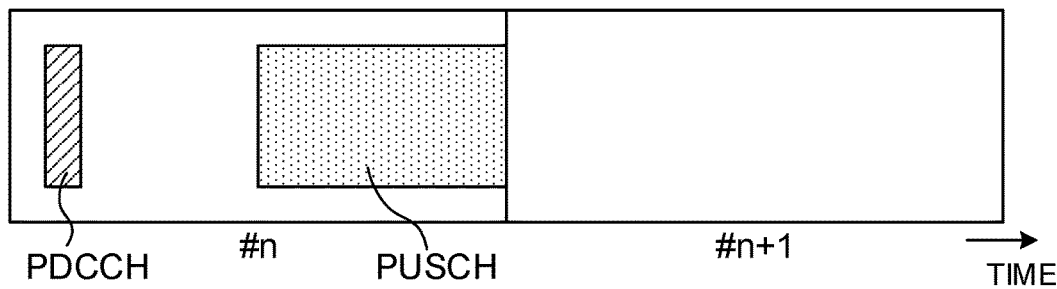
FIGS. 2A to 2E are diagrams illustrating one example of a transmission timing/transmission duration of UL data (PUSCH) in a case where non-slot-based scheduling is applied.
Figure 2B:
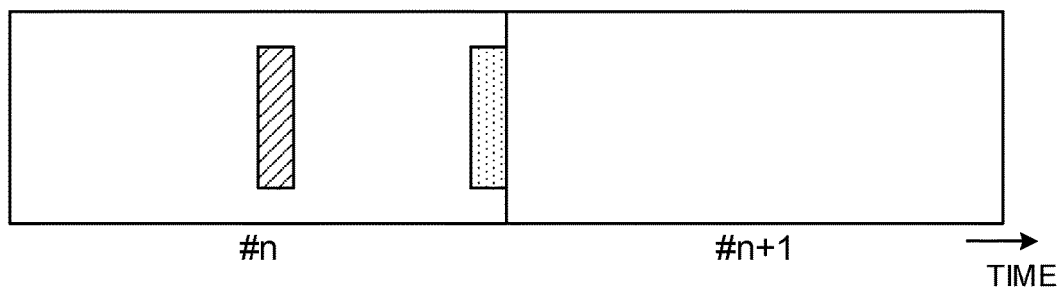

FIGS. 2A and 2B illustrate cases where the base station transmits a PDCCH in the slot # n, and the UE transmits a PUSCH scheduled by the PDCCH in the next slot # n+1. FIG. 2A illustrates a case where a transmission duration (e.g., mini slot size) of the PUSCH is configured wide, and FIG. 2B illustrates a case where the transmission duration of the PUSCH is configured short compared to FIG. 2A.

Figure 2C:
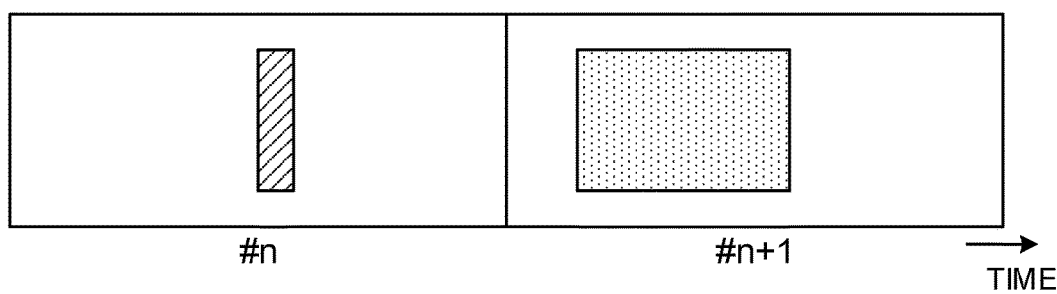
Figure 2D:
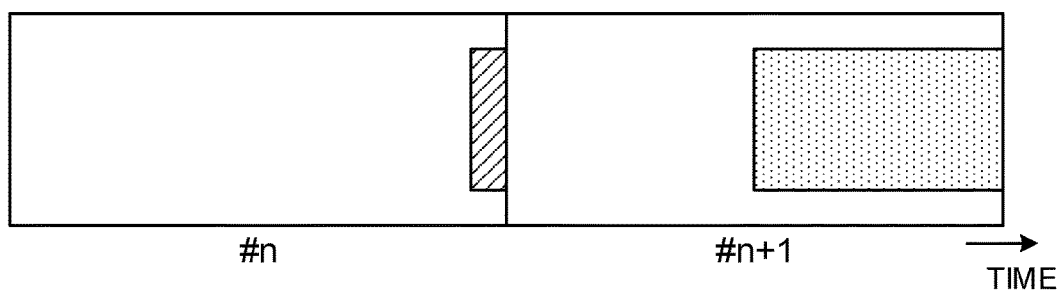
Figure 2E:
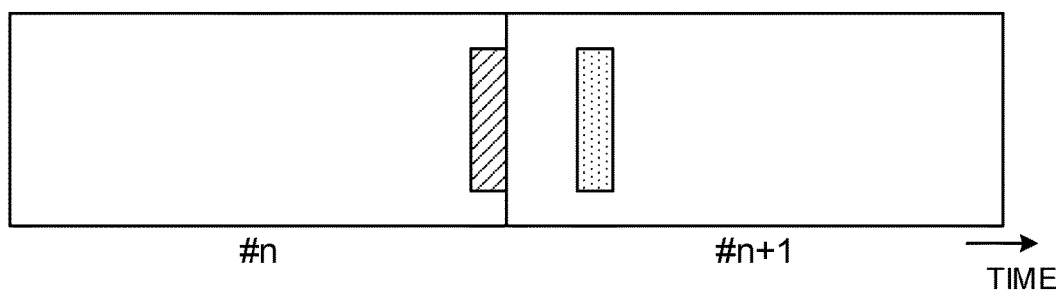

FIGS. 2C to 2E illustrate cases where the PDCCH for instructing UL transmission is transmitted in the slot # n, and the PUSCH is transmitted in the slot # n+1. In FIGS. 2C to 2E, transmission timings/transmission durations of the PDCCH and/or the PUSCH are respectively configured differently.

Thus, when UL data is scheduled in the non-slot unit, it is possible to flexibly configure transmission timings/transmission durations of the downlink control channel and the uplink data channel.

As described above, it is assumed that, when non-slot-based (e.g., mini slot-based or symbol-based) scheduling is applied, one or both of the transmission timing/transmission duration of A/N for DL data and the transmission timing/transmission duration of the PUSCH are flexibly configured. On the other hand, UL transmission is requested to achieve a low Peak-to-Average Power Ratio (PAPR) and/or low Inter-Modulation Distortion (IMD).

As a method for achieving the low PAPR and/or the low IMD during UL transmission, there is a method (also referred to as UCI piggyback on PUSCH or UCI on PUSCH) for transmitting UCI on a PUSCH when UCI transmission and UL data (PUSCH) transmission occur at the same timing on an identical carrier.

Hence, it is considered to perform UCI on PUSCH similar to legacy LTE systems in a case where transmission timings/transmission durations of a PUSCH and/or UCI (e.g., A/N) are flexibly controlled (non-slot-based scheduling). However, the legacy LTE systems assume that transmission timings/transmission durations of data and UCI (e.g., A/N) are fixedly configured. Therefore, there is a risk that it is not possible to appropriately control transmission (e.g., UCI on PUSCH) of data and/or UCI to be transmitted in transmission durations of variable lengths.

Hence, the inventors of this application have conceived defining UCI transmission conditions and/or a UCI allocation method that use an uplink shared channel for transmission of the uplink shared channel and/or the UCI whose transmission durations/transmission timings can be variably (flexibly) controlled, and controlling UCI on PUSCH.

According to one aspect of the present embodiment, in a communication system that can configure at least one of a transmission timing/transmission duration of a PUSCH and a transmission timing/transmission duration of UCI differently per transmission, UCI is transmitted by using the PUSCH (UCI on PUSCH) in a case where the transmission duration of the PUSCH and at least part of the transmission duration of the UCI overlap.

The present embodiment will be described below. In addition, the present embodiment is suitably applicable to a case where simultaneous PUSCH and PUCCH transmission is not configured, yet is not limited to this.

Furthermore, according to the present embodiment, the UCI includes at least one of a Scheduling Request (SR), transmission acknowledgement information (also referred to as HARQ-ACK: Hybrid Automatic Repeat reQuest-Acknowledge, ACK or Negative ACK (NACK) or A/N) for a DL data channel (e.g., PDSCH: Physical Downlink Shared Channel), Channel State Information (CSI), beam index information (BI: Beam Index), and a Buffer Status Report (BSR).

(First Aspect)

The first aspect will describe UCI on PUSCH in a case where transmission timings/transmission durations of an uplink shared channel (e.g., PUSCH) and UCI (e.g., A/N) are controlled to be aligned.

Figure 3:
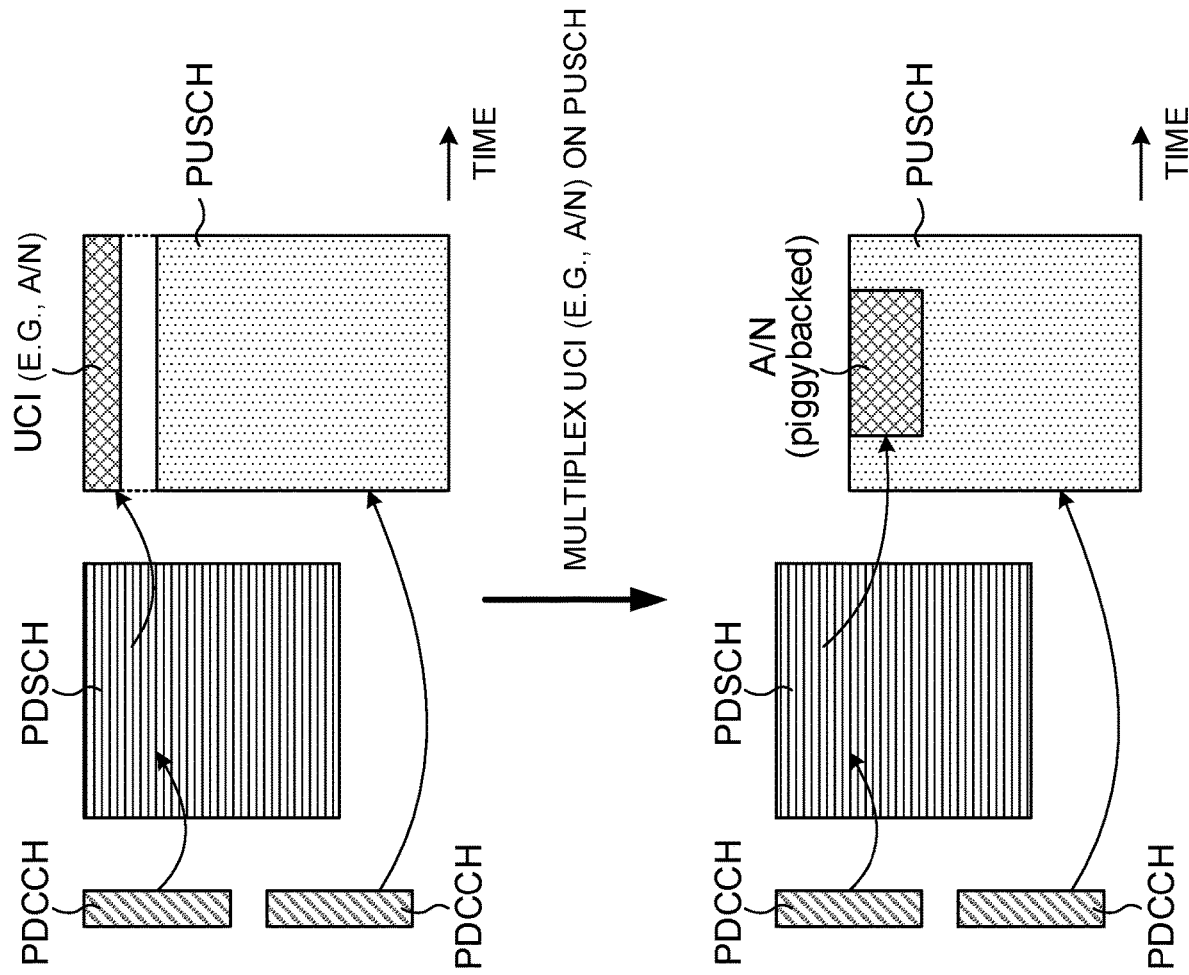
FIG. 3 is a diagram illustrating one example of UCI transmission that uses a PUSCH in a case where the transmission timings and/or transmission durations of the PUSCH and the UCI are aligned.

FIG. 3 illustrates one example of a case where non-slot-based (e.g., mini slot-based) scheduling is applied to control transmission of DL data (PDSCH), UL data (PUSCH) and UCI. In addition, a case where the UCI is A/N for DL data will be described as an example. However, the UCI is not limited to this.

A base station transmits DCI (e.g., DL assignment) for scheduling the PDSCH, and DCI (e.g., UL grant) for scheduling the PUSCH on the PDCCH. The DL assignment and the UL grant may be transmitted at the same timing or may be transmitted at different timings. Furthermore, a reception timing and/or a reception duration of the PDSCH may be indicated to a UE by using the DCI for scheduling the PDSCH. The transmission timing/transmission duration of A/N for the PDSCH may be indicated to the UE by using the DCI for scheduling the PDSCH.

Furthermore, the transmission timing/transmission duration of the PUSCH may be indicated to the UE by using the DCI for scheduling the PUSCH. The UE receives the DCI (e.g., DL assignment) for scheduling the PDSCH, and the DCI (e.g., UL grant) for scheduling the PUSCH, and therefore monitors the PDCCH at and with given timing and/or resource, and controls reception of the PDSCH, transmission of HARQ-ACK for the PDSCH or transmission of the PUSCH based on the detected DCI.

A case will be assumed where a transmission timing/transmission duration of A/N for the PDSCH scheduled by the DL assignment, and the transmission timing/transmission duration of the PUSCH scheduled by the UL grant overlap. In addition, scheduling of the PUSCH may be controlled by using a higher layer signaling (or DCI+the higher layer signaling). Furthermore, an instruction of the transmission timing/transmission duration of UCI may be controlled by using the higher layer signaling (or the DCI+the higher layer signaling).

The UE controls UL transmission assuming that the transmission timing/transmission duration of PUSCH transmission, and the transmission timing/transmission duration of UCI transmission are aligned. On the other hand, the base station controls, for example, scheduling such that the transmission timing/transmission duration of PUSCH transmission, and the transmission timing/transmission duration of UCI transmission are aligned. For example, the base station receives, from the UE, UE capability that is necessary for processing from PDSCH reception to UCI (e.g., A/N) transmission, and controls scheduling of the PUSCH and the instruction of the transmission timing/transmission duration of A/N based on the UE capability.

When PUSCH transmission and A/N transmission coincide (also referred to as overlap or collide), the user terminal multiplexes (piggybacks) the UCI on the PUSCH based on a given rule (piggyback rule) and performs UL transmission. In this regard, as the given rule for multiplexing the UCI on the PUSCH, there is a method for allocating the UCI to given symbols and given Resource Elements (REs) included in the PUSCH, and rate-matching and/or puncturing the data corresponding to the resource elements to be allocated to the UCI. In this case, the user terminal assumes that the transmission timings/transmission durations of the PUSCH and A/N are aligned, so that it is possible to control UCI on PUSCH without taking a difference in the transmission timings/transmission durations between the PUSCH and the UCI into account as the given condition.

Alternatively, even when the transmission timings/transmission durations of the PUSCH and/or the UCI are made changeable per transmission, it is also possible to control UCI on PUSCH similar to the legacy LTE systems by aligning the transmission timings/transmission durations of the PUSCH and the UCI.

(Second Aspect)

The second aspect will describe UCI on PUSCH in a case where transmission timings/transmission durations of an uplink shared channel (e.g., PUSCH) and UCI (e.g., A/N) are not aligned and are controlled.

When the transmission timings/transmission durations of the PUSCH and the UCI are not aligned, a UE may perform control to transmit the UCI by using the PUSCH in a case where at least part of the transmission durations of the PUSCH and the UCI overlap. In this case, the UE may control multiplexing (or allocation) of the UCI on the PUSCH according to the transmission timings (e.g., transmission start timings) of the UCI and the PUSCH.

Hereinafter, a case (case 1) where the transmission start timing of the UCI is configured to come after the transmission start timing of the PUSCH, and a case (case 2) where the transmission start timing of the UCI is configured to come at the same time as or before the transmission start timing of the PUSCH. In addition, the following description will describe a case where a transmission timing of DCI for scheduling the PUSCH is configured to come before the transmission timing of the PDSCH matching A/N, yet is not limited to this, and the transmission timings may be reverse.

<Case 1>

Figure 4:
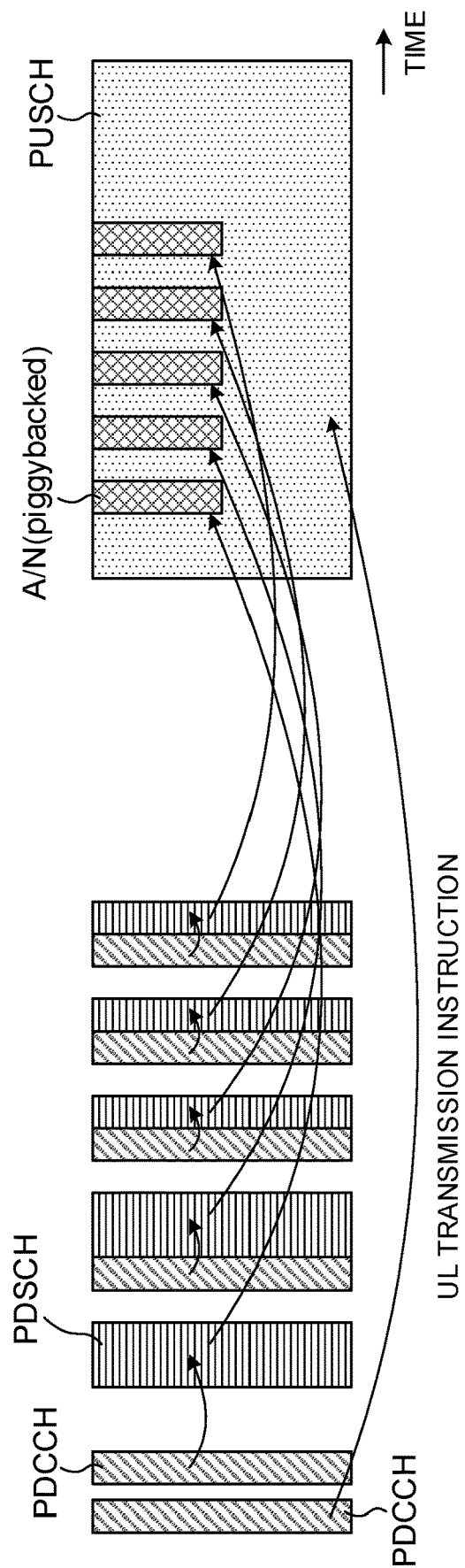
FIG. 4 is a diagram illustrating one example of UCI transmission that uses a PUSCH in a case where the transmission timings and/or transmission durations of the PUSCH and the UCI are not aligned (different).

FIG. 4 illustrates one example of UCI on PUSCH in a case where the transmission start timing of the UCI is configured to come after the transmission start timing of the PUSCH. The UE multiplexes one or more pieces of UCI that overlap at least part or entirety of the transmission duration of the PUSCH, on the PUSCH to transmit. In FIG. 4, transmission durations of a plurality of (5 in this case) A/Ns respectively matching a plurality of PDSCHs are included in the transmission duration of one PUSCH. In this case, the UE multiplexes (piggybacks) a plurality of A/Ns on the PUSCH to transmit. Multiplexing may be realized by rate-matching data included in the PUSCH, or puncturing the data.

A method for multiplexing (allocating) each UCI on the PUSCH may be controlled based on a difference in transmission timings/transmission durations between the PUSCH and each UCI (and/or between each UCI). When, for example, each UCI is multiplexed on (allocated to) the PUSCH, a different rule (UCI piggyback rule) may be applied to each UCI according to the transmission timing/transmission duration. That is, in the case 1 of the second aspect, when the UCI is multiplexed on (allocated to) the PUSCH, a difference in the transmission timings/transmission durations between the PUSCH and each UCI (and/or between each UCI) is taken into account.

For example, the UE controls an allocation position and/or duration of each UCI with respect to the PUSCH according to the transmission timing/transmission duration of each UCI.

Figure 5B:
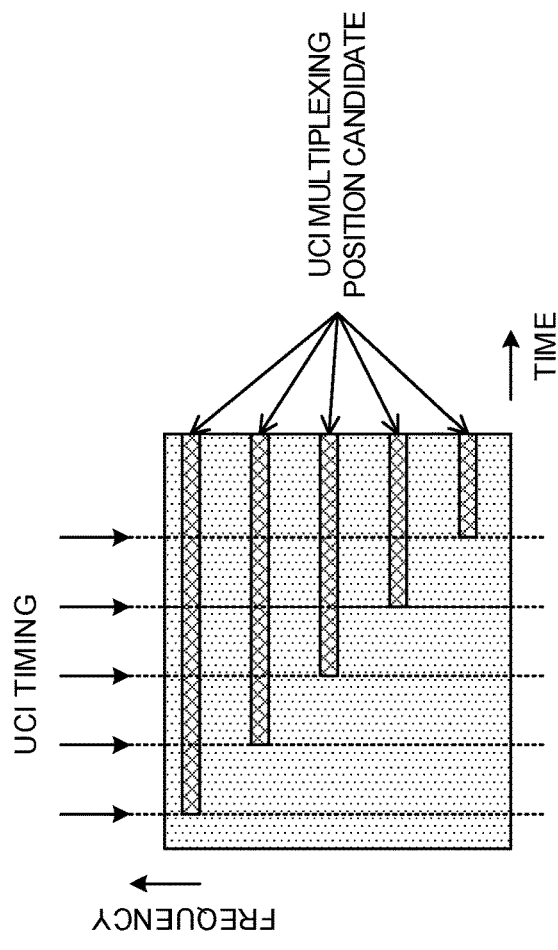
FIGS. 5A and 5B are diagrams illustrating one example of a case where allocation to the PUSCH is controlled based on a UCI transmission timing.
Figure 5A:
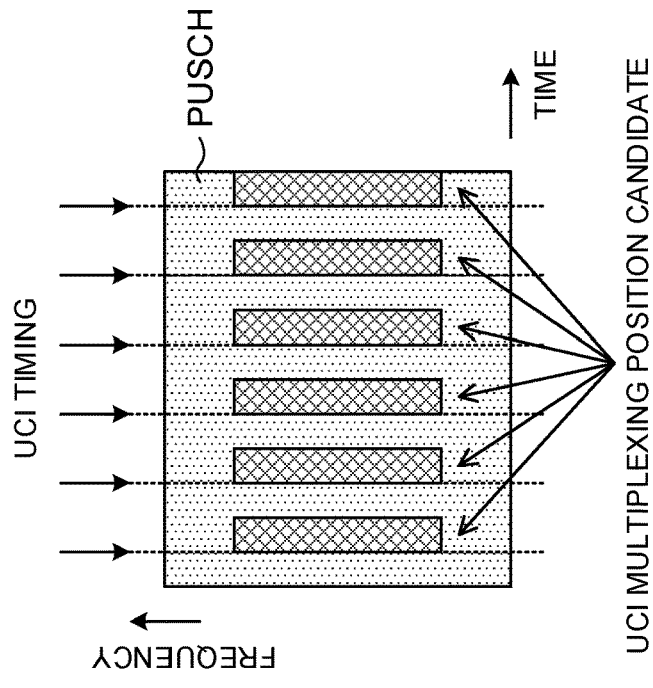

FIG. 5 illustrates one example of a method for multiplexing (a method for allocating) UCI on a PUSCH. FIG. 5A illustrates a case where a plurality of candidate domains that are UCI allocation candidates are configured in a PUSCH domain. FIG. 5A illustrates a case where a plurality of candidate domains are configured in a time direction (so as to be distributed in the time direction). That is, each candidate domain is configured to a respectively different time domain. In addition, a frequency domain to which each candidate domain is configured may be the same or different. Furthermore, an allocation domain in a frequency direction may be controlled based on a size (capacity) of each UCI.

The UE distributes and allocates each UCI to the respectively different candidate domain based on a transmission timing of each UCI (in order of transmission timings of the pieces of UCI). For example, the UE allocates UCI whose transmission start timing is the earliest among multiple UCI (e.g., A/N) to a candidate domain that is arranged first in the time direction. Consequently, it is possible to allocate UCI (in order from the UCI whose transmission preparation is finished) to the PUSCH before processing of all pieces of UCI is finished, so that it is possible to prevent delay of UL transmission.

Furthermore, UCI allocation candidate domains may be configured to be distributed in the frequency direction (see FIG. 5B). FIG. 5B illustrates a case where a plurality of candidate domains that are the UCI allocation candidates are configured in the frequency direction (so as to be distributed in at least the frequency direction) in the PUSCH domain. That is, each candidate domain is configured to a respectively frequency domain.

Furthermore, a time domain of each candidate domain may be configured based on the transmission start timing of each UCI transmission. For example, the time domain of each candidate domain is configured differently according to the transmission start timing. Consequently, it is possible to reserve more resources in a case of UCI that is multiplexed at an earlier timing, and consequently improve quality of this UCI. Furthermore, in this case, the allocation domain in the frequency direction may be expanded for the candidate domain for UCI whose transmission start timing is late. Consequently, it is possible to make capacities (sizes) that can be allocated to a plurality of candidate domains matching the pieces of UCI of different transmission start timings uniform.

In addition, FIG. 5 illustrates a case where multiplexing of each UCI (allocation position and/or duration) on the PUSCH is controlled based on the transmission start timing of each UCI. However, multiplexing may be controlled by taking other conditions into account. For example, the allocation position and/or duration may be controlled based on at least one or a combination of the transmission timing/transmission duration of the PUSCH, the transmission timing/transmission duration of the UCI and a UCI type (HARQ-ACK, CSI or an SR).

When, for example, the UCI is the CSI, a UCI size becomes large, and therefore UCI may be multiplexed on a plurality of candidate domains. Alternatively, a plurality of candidate domains of different sizes (allocation domains) may be configured, and a candidate domain on which the UCI is multiplexed may be selected according to a type of the UCI (UCI type). Consequently, it is possible to appropriately multiplex the UCI on the PUSCH even when the UCI type is different.

<Case 2>

Figure 6:
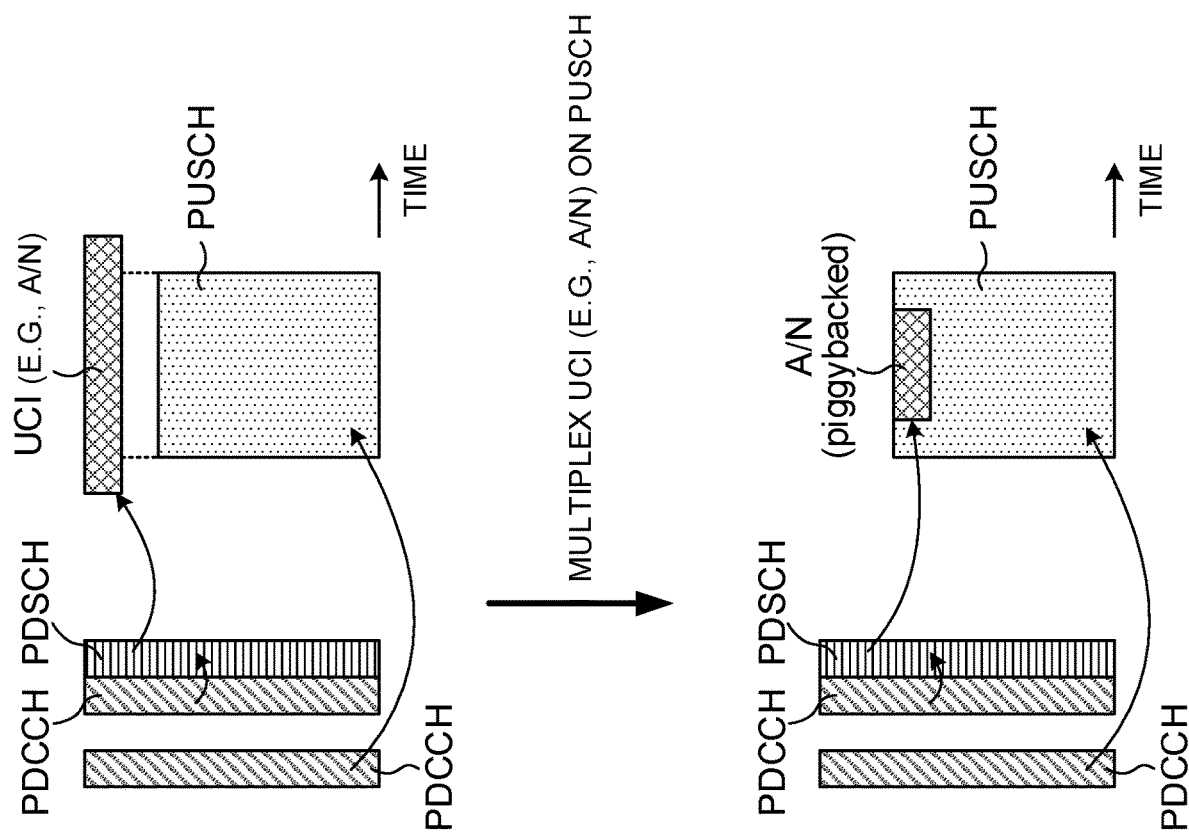
FIG. 6 is a diagram illustrating another example of UCI transmission that uses the PUSCH in a case where the transmission timings and/or the transmission durations of the PUSCH and the UCI are not aligned (different).

FIG. 6 illustrates one example of UCI on PUSCH in a case where a transmission start timing of UCI is configured to come before a transmission start timing of a PUSCH. FIG. 6 illustrates a case where the UCI is configured to come before the transmission start timing of the PUSCH, and a transmission duration of the UCI is longer than that of the PUSCH.

In this case, the UE multiplexes (piggybacks) the UCI on the PUSCH to transmit. The UE may performs a method for multiplexing (allocating) the UCI on the PUSCH similar to a case where the transmission timings/transmission durations of the PUSCH and the UCI are aligned (see, for example, FIG. 3). When the UCI is configured to come before the transmission start timing of the PUSCH, transmission preparation of the UCI is finished at a start of transmission of the PUSCH, so that it is possible to perform multiplexing similar to a case where the transmission timings/transmission durations of the PUSCH and the UCI are aligned without causing, for example, delay.

Furthermore, FIG. 6 illustrates a case where UCI is configured to come before a transmission start timing of a PUSCH, and a transmission duration of the UCI is longer than that of the PUSCH. However, there is also considered a case where the UCI is shorter than the transmission duration of the PUSCH (a case where the transmission duration of the UCI ends in the middle of the transmission duration of the PUSCH).

When the UCI is configured to come before the transmission start timing of the PUSCH and the transmission duration of the UCI is shorter than that of the PUSCH, multiplexing may be performed similar to a case where the transmission timings/transmission durations of the PUSCH and the UCI are aligned as illustrated in FIG. 6.

Furthermore, when the UCI is configured to come before the transmission start timing of the PUSCH and the transmission duration of the UCI is shorter than that of the PUSCH, there is also considered a case where other UCI is transmitted in a duration in which the UCI and the PUSCH do not overlap. In this case, the transmission duration of the PUSCH and transmission durations of multiple UCI overlap.

When the transmission durations of multiple UCI are included in the transmission duration of the PUSCH, a method for multiplexing each UCI on the PUSCH may be controlled based on a difference in the transmission timings/transmission durations between the PUSCH and each UCI (and/or between each UCI) as described in the above case 1. Alternatively, the UCI whose transmission start timing is earlier than that of the PUSCH may be multiplexed similar to a case where the transmission timings/transmission durations of the PUSCH and the UCI are aligned. Multiplexing of the other UCI may be controlled based on the difference in the transmission timings/transmission durations between the PUSCH and each UCI (and/or between each UCI).

Thus, by controlling multiplexing (allocation) of the UCI on the PUSCH based on the transmission start timings of the PUSCH and the UCI and the number of pieces of UCI that overlap the transmission duration of the PUSCH, it is possible to perform appropriate allocation per UCI and transmit each UCI.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied in combination.

Figure 7:
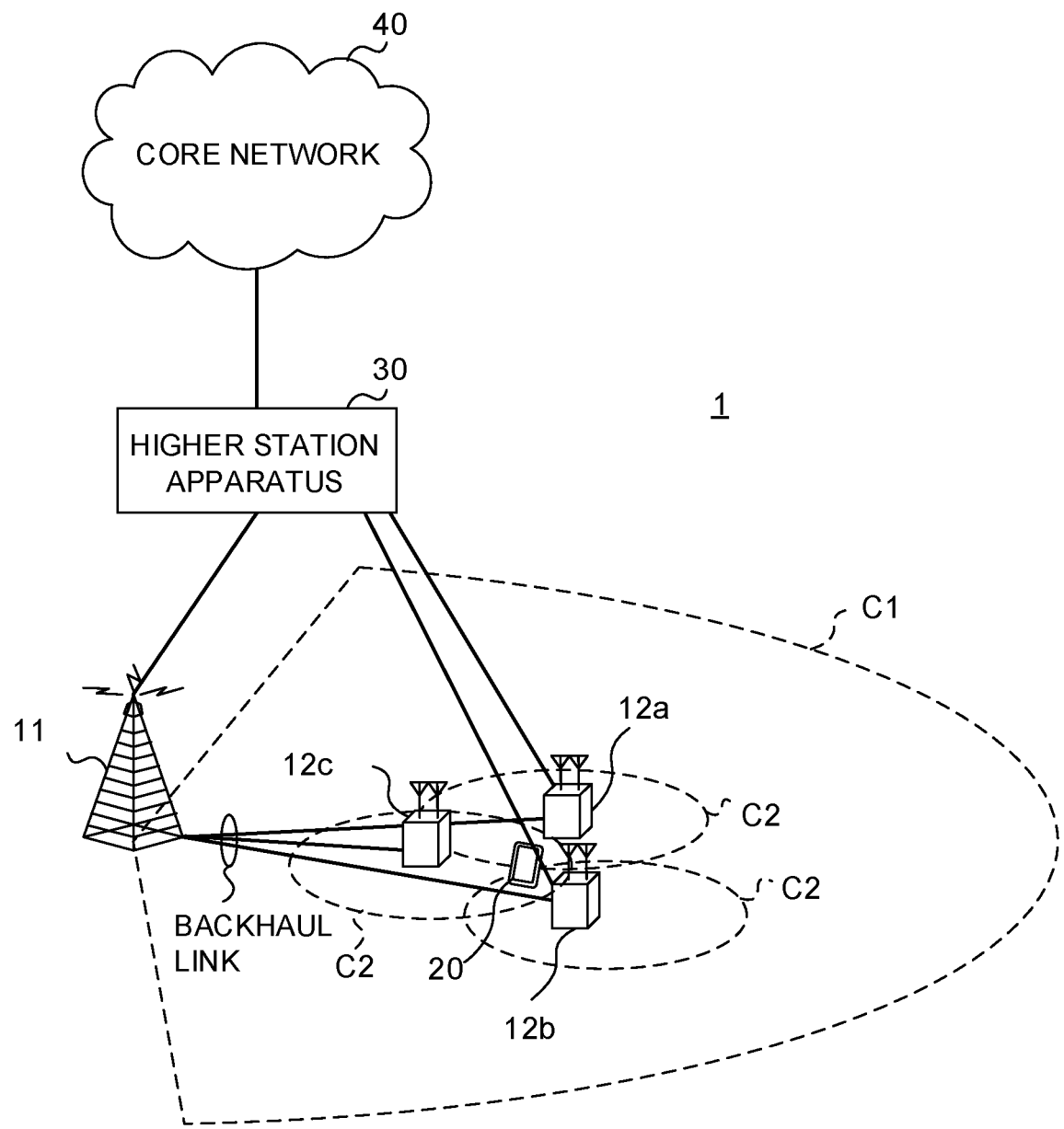
FIG. 7 is a diagram illustrating one example of a schematic configuration of a radio communication system according to the present embodiment.

FIG. 7 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) or New-RAT (NR).

The radio communication system 1 illustrated in FIG. 7 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells. In this regard, the numerology refers to a communication parameter set that characterizes a signal design of a certain RAT and/or an RAT design.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can communicate by using Time Division Duplex (TDD) or Frequency Division Duplex (FDD) in each cell. A TDD cell and an FDD cell may be each referred to as a TDD carrier (frame configuration type 2) and an FDD carrier (frame configuration type 1).

Furthermore, in each cell (carrier), one of a subframe (also referred to as a TTI, a general TTI, a long TTI, a general subframe, a long subframe or a slot) having a relatively long time duration (e.g., 1 ms) or a subframe (also referred to as a short TTI, a short subframe or a slot) having a relatively short time duration may be applied, or both of the long subframe and the short subframe may be applied. Furthermore, in each cell, a subframe of 2 or more time durations may be applied.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device-to-Device communication (D2D) with the other user terminal 20.

The radio communication system 1 applies Orthogonal Frequency-Division Multiple Access (OFDMA) to downlink (DL) and Single Carrier-Frequency Division Multiple Access (SC-FDMA) to uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL. Furthermore, SC-FDMA is applicable to Sidelink (SL) used for device-to-device communication.

The radio communication system 1 uses a DL data channel (also referred to as a PDSCH: Physical Downlink Shared Channel or a DL shared channel) shared by each user terminal 20, a broadcast channel (PBCH: Physical Broadcast Channel) and an L1/L2 control channel as DL channels. At least one of user data, higher layer control information and System Information Blocks (SIBs) is conveyed on the PDSCH. Furthermore, Master Information Blocks (MIBs) are conveyed on the PBCH.

The L1/L2 control channel includes a DL control channel (e.g., a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH and/or the EPDCCH. The number of OFDM symbols used for the PDCCH is conveyed on the PCFICH. The EPDCCH is subjected to frequency division multiplexing with the PDSCH and is used to convey DCI similar to the PDCCH. Transmission acknowledgement information (A/N or HARQ-ACK) of the PUSCH can be conveyed on at least one of the PHICH, the PDCCH and the EPDCCH.

The radio communication system 1 uses a UL data channel (also referred to as a PUSCH: Physical Uplink Shared Channel or a UL shared channel) shared by each user terminal 20, a UL control channel (PUCCH: Physical Uplink Control Channel), and a random access channel (PRACH: Physical Random Access Channel) as UL channels. User data and higher layer control information are conveyed on the PUSCH. Uplink Control Information (UCI) including at least one of transmission acknowledgement information (A/N or HARQ-ACK) and Channel State Information (CSI) of the PDSCH is conveyed on the PUSCH or the PUCCH. A random access preamble for establishing connection with a cell can be conveyed on the PRACH.

<Radio Base Station>

Figure 8:
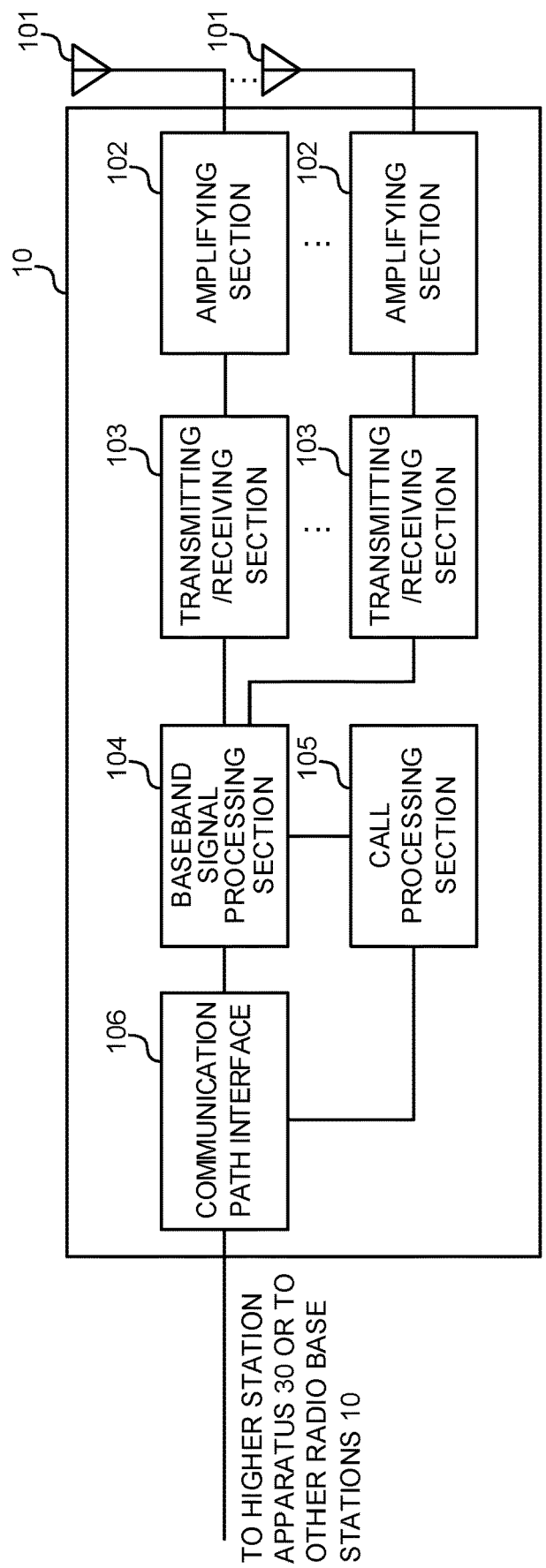
FIG. 8 is a diagram illustrating one example of an overall configuration of a radio base station according to the present embodiment.

FIG. 8 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARM) processing), and transmission processing such as at least one of scheduling, transmission format selection, channel coding, rate matching, scrambling, Inverse Fast Fourier Transform (IFFT) processing, and precoding processing on the user data, and transfers the user data to each transmission/reception section 103. Furthermore, the baseband signal processing section 104 performs transmission processing such as channel coding and/or inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs at least one of call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Each transmission/reception section 103 receives uplink control information multiplexed on an uplink shared channel. Each transmission/reception section 103 transmits information related to a transmission timing/transmission duration of a PUSCH, and/or a transmission timing/transmission duration of UCI (e.g., A/N) to the UE.

Figure 9:
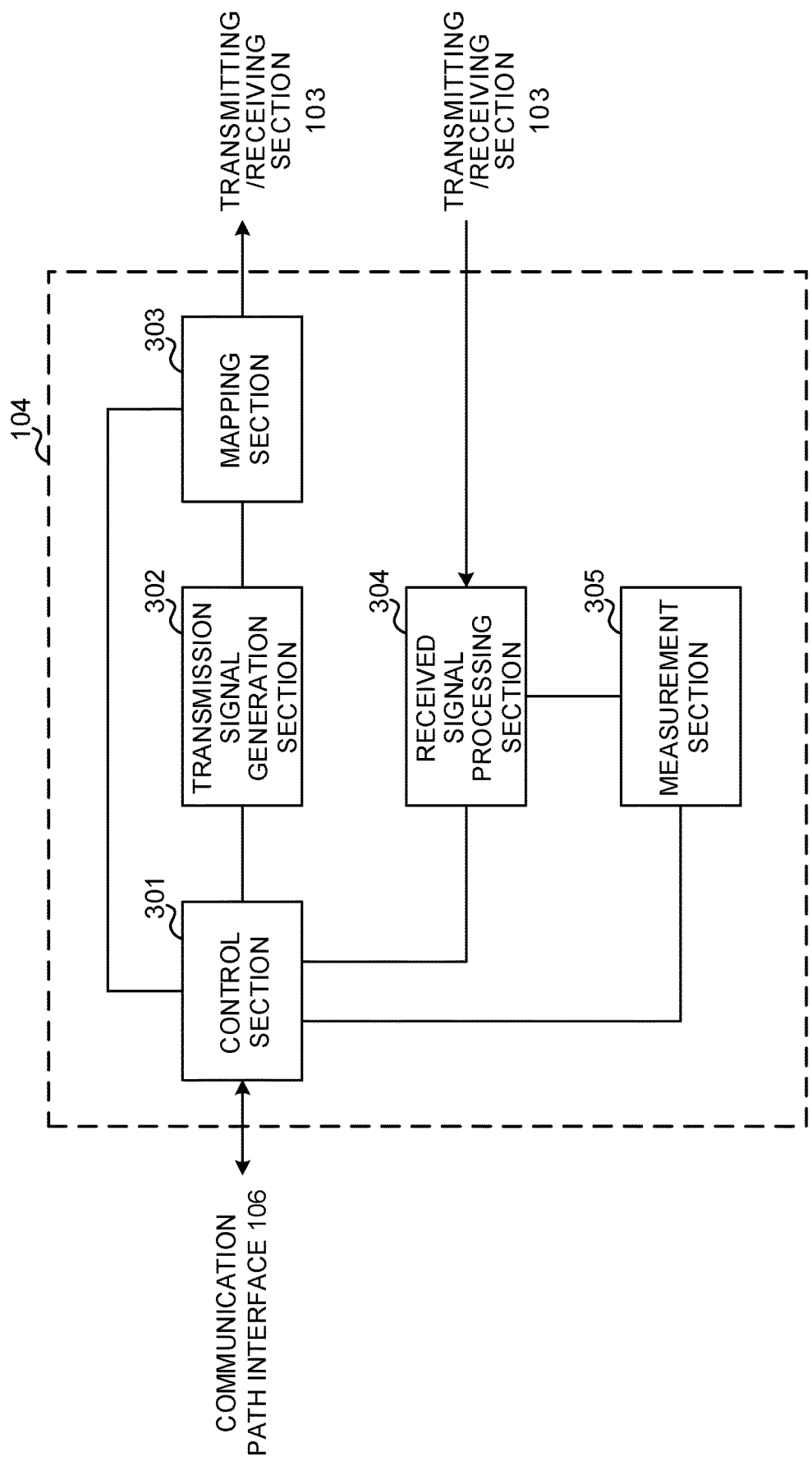
FIG. 9 is a diagram illustrating one example of a function configuration of the radio base station according to the present embodiment.

FIG. 9 is a diagram illustrating one example of a function configuration of the radio base station according to the present embodiment. In addition, FIG. 9 mainly illustrates function blocks of characteristic portions according to the present embodiment, and assumes that the radio base station 10 includes other function blocks, too, that are necessary for radio communication. As illustrated in FIG. 9, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. For example, the control section 301 may configure at least one of the transmission timing and/or the transmission duration of the uplink shared channel, and the transmission timing and/or the transmission duration of the uplink control information differently per transmission.

Furthermore, when making the transmission duration of the uplink shared channel and the transmission duration of the uplink control information overlap, the control section 301 may control the transmission timings such that the transmission timings and/or the transmission durations of the uplink shared channel and the uplink control information are aligned.

The control section 301 can be composed of a controller, a control circuit or a control apparatus described based on the common knowledge in the technical field according to the present invention.

The transmission signal generating section 302 generates a DL signal (including a DL data signal, a DL control signal or a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 may output a received signal and/or a signal after the reception processing to the measurement section 305. Furthermore, the received signal processing section 304 performs UCI reception processing based on a UL control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 10:
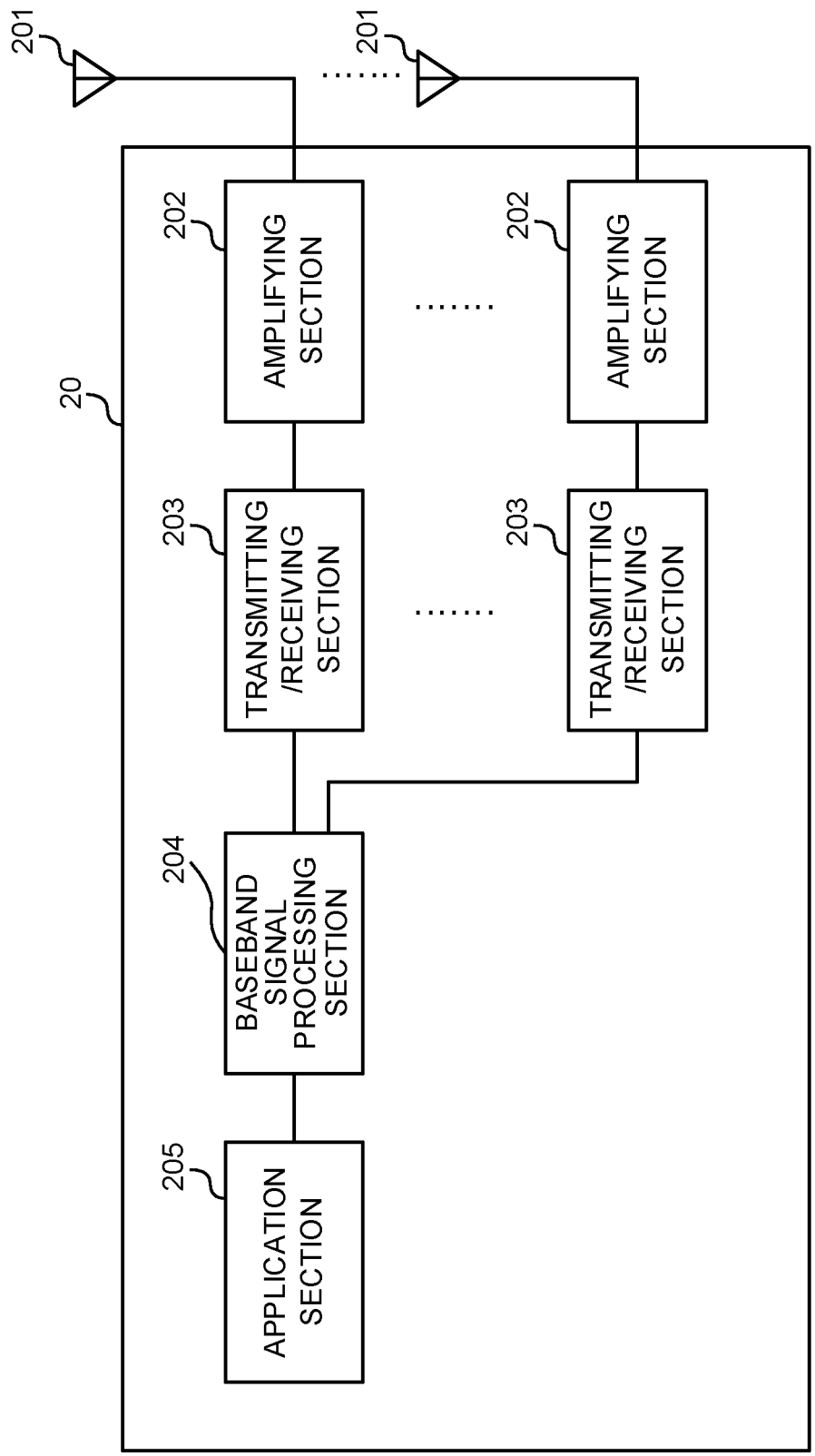
FIG. 10 is a diagram illustrating one example of an overall configuration of a user terminal according to the present embodiment.

FIG. 10 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The respective amplifying sections 202 amplify radio frequency signals received at a plurality of transmission/reception antenna 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs at least one of FFT processing, error correcting decoding, and reception processing of retransmission control on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., HARQ processing), channel coding, rate matching, puncturing, Discrete Fourier Transform (DFT) processing and IFFT processing on the UL data, and transfers the UL data to each transmission/reception section 203. The baseband signal processing section 204 performs at least one of channel coding, rate matching, puncturing, DFT processing and IFFT processing on the UCI (e.g., at least one of A/N of the DL signal, Channel State information (CSI) and a Scheduling Request (SR)), and transfers the UCI to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, when the transmission duration of the uplink shared channel and at least part of the transmission duration of the uplink control information overlap, each transmission/reception section 203 transmits the uplink control information by using the uplink shared channel. Furthermore, each transmission/reception section 203 transmits the information related to the transmission timing/transmission duration of the PUSCH, and/or the information related to the transmission timing/transmission duration of the UCI (e.g., A/N) from the downlink control information and/or the higher layer signaling.

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 11:
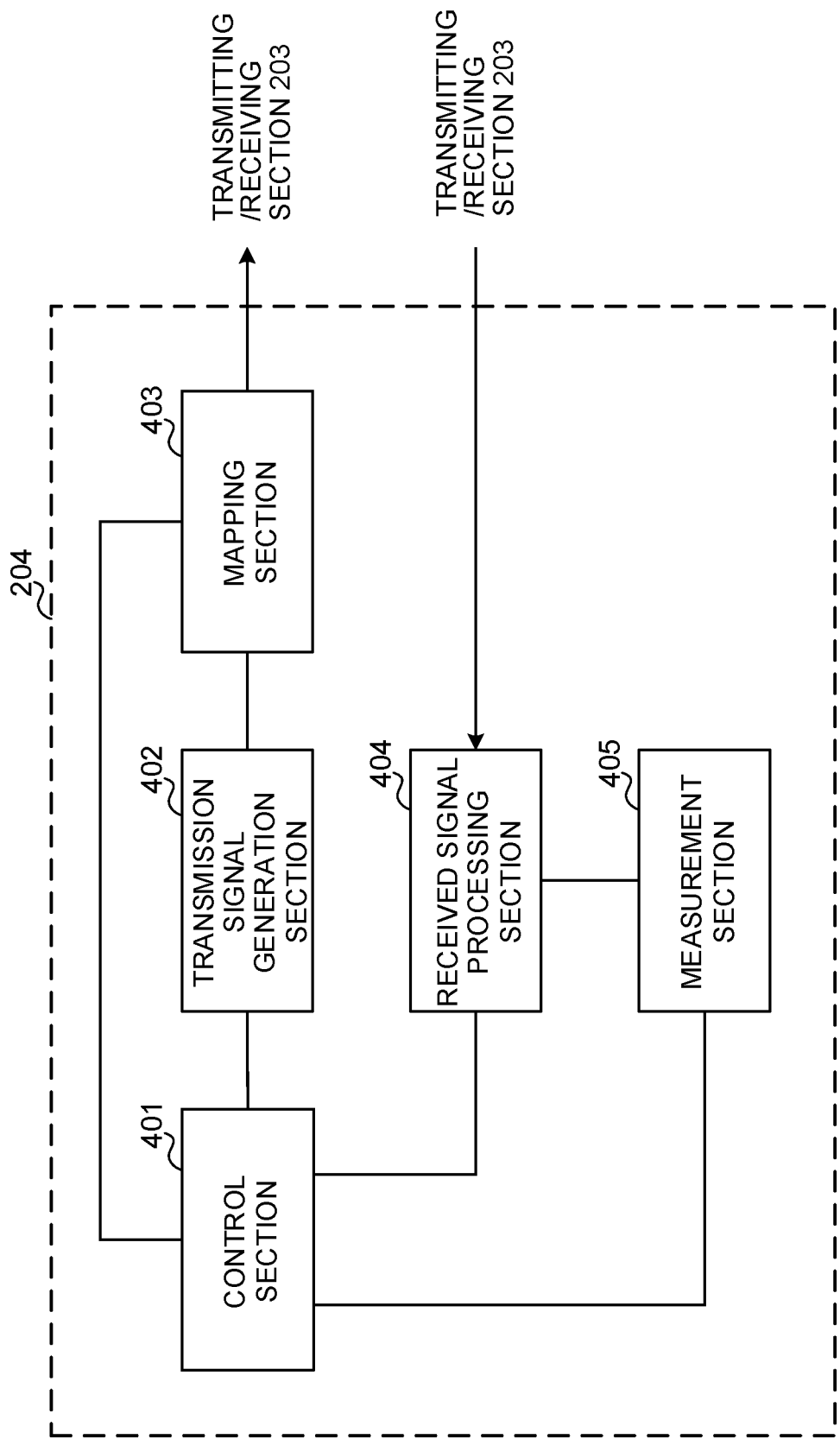
FIG. 11 is a diagram illustrating one example of a function configuration of the user terminal according to the present embodiment.

FIG. 11 is a diagram illustrating one example of a function configuration of the user terminal according to the present embodiment. In addition, FIG. 11 mainly illustrates function blocks of characteristic portions according to the present embodiment, and assumes that the user terminal 20 includes other function blocks, too, that are necessary for radio communication. As illustrated in FIG. 11, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404 and measurement of the measurement section 405.

Furthermore, the control section 401 controls transmission of the uplink control information that uses the uplink shared channel. In, for example, a communication system in which at least one of the transmission timing and/or the transmission duration of the uplink shared channel and the transmission timing and/or the transmission duration of the uplink control information are configured differently per transmission, the control section 401 transmits the uplink control information by using the uplink shared channel in a case where the transmission duration of the uplink shared channel and at least part of the transmission duration of the uplink control information overlap.

Furthermore, when a transmission start timing of the uplink control information comes later than a transmission start timing of the uplink shared channel, the control section 401 may control an allocation position of the uplink control information on the uplink shared channel based on a transmission timing difference and/or a transmission duration difference between the uplink shared channel and the uplink control information. Furthermore, when transmission durations of multiple uplink control information matching a plurality of DL transmission overlap the transmission duration of the uplink shared channel, the control section 401 may perform control to allocate multiple uplink control information respectively to different domains of the uplink shared channel.

Furthermore, the control section 401 may control the allocation position of the uplink control information on the uplink shared channel based on a type of the uplink control information. Furthermore, when the transmission start timing of the uplink control information comes earlier than the transmission start timing of the uplink shared channel, the control section 401 may control the allocation position of the uplink control information on the uplink shared channel assuming that the transmission timings and/or the transmission durations of the uplink shared channel and the uplink control information are aligned.

Alternatively, when the transmission duration of the uplink shared channel and the transmission duration of the uplink control information overlap, the control section 401 may control transmission of the uplink control information by using the uplink shared channel assuming that the transmission timings and/or the transmission durations of the uplink shared channel and the uplink control information are aligned. Furthermore, when the transmission duration of the uplink control information overlaps, the control section 401 may control allocation of the uplink control information to the uplink shared channel assuming that the transmission timings and/or the transmission durations of the uplink shared channel and the uplink control information are identical.

The control section 401 can be composed of a controller, a control circuit or a control apparatus described based on the common knowledge in the technical field according to the present invention.

The transmission signal generating section 402 generates (e.g., encodes, rate-matches, punctures and modulates) a UL signal (including a UL data signal, a UL control signal, a UL reference signal and UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal). The received signal processing section 404 outputs information received from the radio base station 10 to the control section 401. The received signal processing section 404 outputs, for example, broadcast information, system information, higher layer control information of a higher layer signaling such as an RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 12:
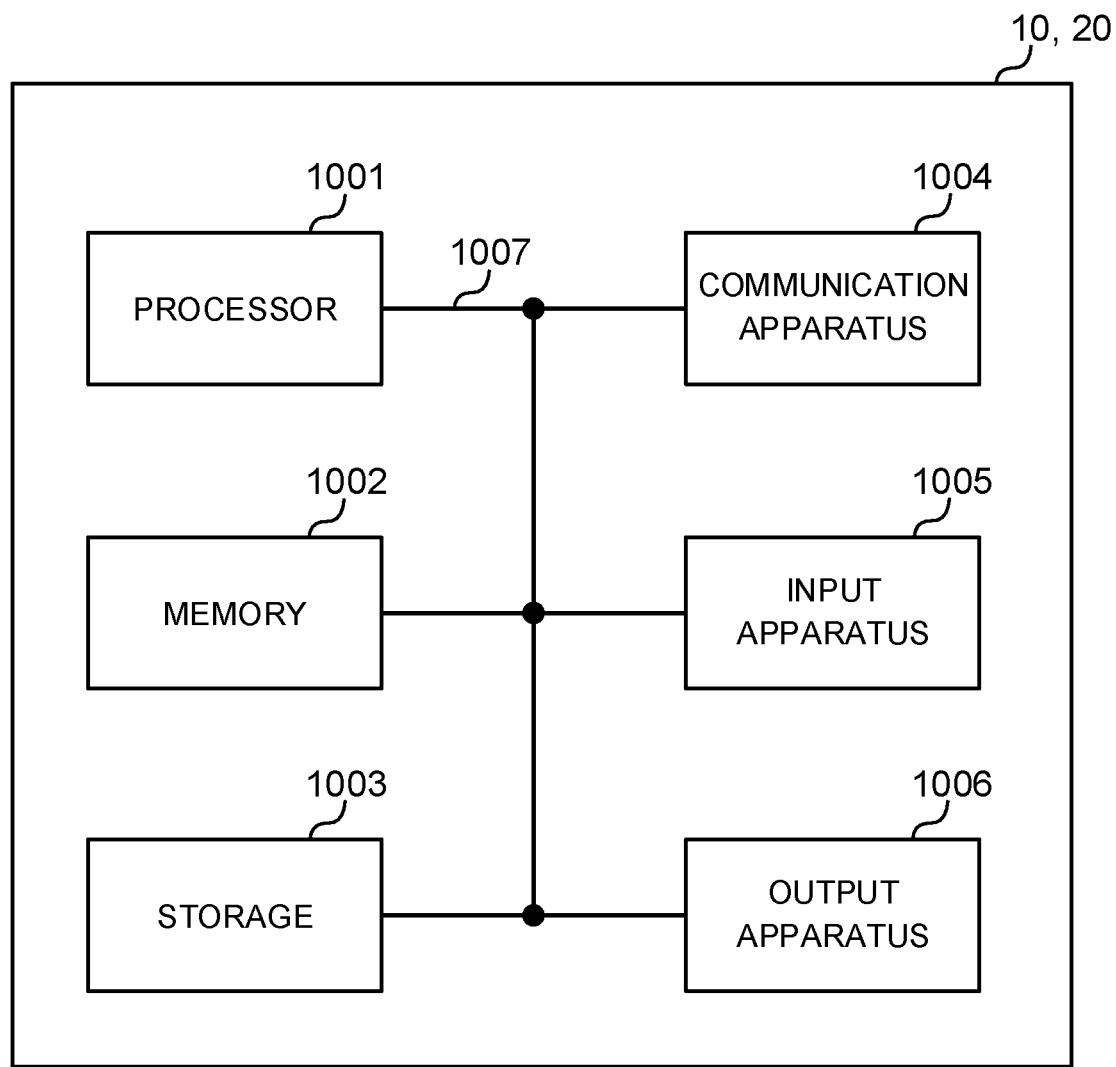
FIG. 12 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 12 is a diagram illustrating one example of the hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by one processor or processing may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the present embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only by explicit notification but also implicit notification (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description intends for exemplary explanation, and does not bring any restrictive meaning to the present invention.

The invention claimed is:

1. A terminal comprising:
   a receiver that receives first downlink control information (DCI) for scheduling a physical uplink shared channel (PUSCH) and second DCI for scheduling a physical downlink shared channel (PDSCH); and
   a transmitter that, when a transmission duration of the PUSCH notified by the first DCI and at least part of a transmission duration of a physical uplink control channel (PUCCH) for carrying uplink control information (UCI) notified by the second DCI overlap, transmits the UCI using the PUSCH and does not transmit the PUCCH,
   wherein a start symbol of the PUSCH notified by the first DCI and a start symbol of the PUCCH notified by the second DCI are after a last symbol of a physical downlink control channel (PDCCH) carrying the first DCI and a last symbol of another PDCCH carrying the second DCI.

2. The terminal according to claim 1, wherein the UCI includes transmission acknowledgement information (HARQ-ACK) that corresponds to the PDSCH.

3. A base station comprising:
   a transmitter that transmits first downlink control information (DCI) for scheduling a physical uplink shared channel (PUSCH) and second DCI for scheduling a physical downlink shared channel (PDSCH); and
   a receiver that, when a transmission duration of the PUSCH notified by the first DCI and at least part of a transmission duration of a physical uplink control channel (PUCCH) for carrying uplink control information (UCI) notified by the second DCI overlap, receives the UCI using the PUSCH and does not receive the PUCCH,
   wherein a start symbol of the PUSCH notified by the first DCI and a start symbol of the PUCCH notified by the second DCI are after a last symbol of a physical downlink control channel (PDCCH) carrying the first DCI and a last symbol of another PDCCH carrying the second DCI.

4. A radio communication method for a terminal comprising:
   receiving first downlink control information (DCI) for scheduling a physical uplink shared channel (PUSCH) and second DCI for scheduling a physical downlink shared channel (PDSCH); and
   when a transmission duration of the PUSCH notified by the first DCI and at least part of a transmission duration of a physical uplink control channel (PUCCH) for carrying uplink control information (UCI) notified by the second DCI overlap, transmitting the UCI using the PUSCH and not transmitting the PUCCH,
   wherein a start symbol of the PUSCH notified by the first DCI and a start symbol of the PUCCH notified by the second DCI are after a last symbol of a physical downlink control channel (PDCCH) carrying the first DCI and a last symbol of another PDCCH carrying the second DCI.

5. A system comprising a terminal and a base station, wherein:
   the terminal comprises:
      a first receiver that receives first downlink control information (DCI) for scheduling a physical uplink shared channel (PUSCH) and second DCI for scheduling a physical downlink shared channel (PDSCH); and a first transmitter that, when a transmission duration of the PUSCH notified by the first DCI and at least part of a transmission duration of a physical uplink control channel (PUCCH) for carrying uplink control information (UCI) notified by the second DCI overlap, transmits the UCI using the PUSCH and does not transmit the PUCCH; and the base station comprises:

a second transmitter that transmits the first DCI and the second DCI; and a second receiver that, when the transmission duration of the PUSCH and at least part of the transmission duration of the PUCCH overlap, receives the UCI using the PUSCH and does not receive the PUCCH, wherein a start symbol of the PUSCH notified by the first DCI and a start symbol of the PUCCH notified by the second DCI are after a last symbol of a physical downlink control channel (PDCCH) carrying the first DCI and a last symbol of another PDCCH carrying the second DCI.

* * * * *